(12) United States Patent
Grandbois

(10) Patent No.: US 6,292,283 B1
(45) Date of Patent: Sep. 18, 2001

(54) AUDIO/VIDEO DEVICE INCLUDING AN INFRARED TRANSCEIVER FOR TRANSMITTING AND RECEIVING CONFIGURATION DATA, AND METHOD FOR CONFIGURING SAME

(75) Inventor: Brett J. Grandbois, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/118,387

(22) Filed: Jul. 17, 1998

(51) Int. Cl.[7] ............................. H04B 10/00; H04N 5/44
(52) U.S. Cl. .................... 359/143; 359/146; 359/172; 348/734
(58) Field of Search ..................... 359/142, 143, 359/146, 147, 148, 144, 145, 172; 348/734

(56) References Cited

U.S. PATENT DOCUMENTS

| | | | |
|---|---|---|---|
| 5,594,509 | * 1/1997 | Florin et al. | 348/734 |
| 5,646,608 | * 7/1997 | Shintani | 359/147 |
| 5,831,664 | * 11/1998 | Wharton et al. | 725/81 |
| 5,845,282 | * 12/1998 | Alley et al. | 707/10 |

* cited by examiner

Primary Examiner—Jason Chan
Assistant Examiner—Christina Y. Leung

(57) ABSTRACT

An audio/video device including an infrared transceiver for transmitting and receiving configuration data is described, along with an associated configuration method. The audio/video device includes audio/video circuitry, a control unit, and an infrared transceiver. The audio/video circuitry receives input presentation data (i.e., video and/or audio data) and performs an audio/video operation (e.g., decoding, filtering, amplification, etc.) upon the input presentation data in order to produce output presentation data. The control unit is coupled to and controls the operations of the audio/video circuitry and the infrared transceiver. The infrared transceiver transmits and receives configuration data via infrared signals, wherein received configuration data is used to configure operation of the audio/video circuitry. The infrared transceiver includes an infrared transmitter and an infrared receiver. The infrared transmitter is used to transmit infrared signals conveying a set of configuration options to an external device (e.g., a portable computer). The infrared receiver is used to receive an infrared signal indicating a selected member of the set of configuration options, either from the external device or a remote control unit of the audio/video device.

13 Claims, 2 Drawing Sheets

AUDIO/VIDEO DEVICE INCLUDING AN INFRARED TRANSCEIVER FOR TRANSMITTING AND RECEIVING CONFIGURATION DATA, AND METHOD FOR CONFIGURING SAME

BACKGROUND OF THE INVENTION

1. Field of the Invention

This invention relates to consumer electronic devices such as televisions, video cassette recorders, optical disk players and the like, and more particularly to consumer electronic devices including remote control units for remotely controlling the operations of the electronic devices.

2. Description of the Related Art

Many consumer electronic devices (e.g., televisions, video cassette recorders, optical disk players, etc.) are available with handheld infrared (IR) remote control units. Such remote control units typically include IR transmitters for sending coded IR signals to the electronic devices. The IR signals are received by IR receivers within the electronic devices, and the decoded IR signals are used to control the operations of the electronic devices. Remote control units allow a user to conveniently control the operations of an electronic device from virtually any location within the room in which the electronic device resides.

One problem that arises is that each electronic device typically requires a different remote control unit. Thus a user having several different electronic devices typically has a corresponding number of remote control units, each of which controls only one of the electronic devices. Compounding this problem is the fact that remote control units are often very similar in appearance. The user must remember to use the right remote control unit to control a given electronic device, and experiences frustration when he or she attempts to use the wrong remote control unit by mistake.

A typical remote control unit is a simple device including a keypad in addition to the IR transmitter. The keypad typically has several electronic switches or "keys", many of which are assigned a specific function. For example, a typical remote control for a television (TV) includes separate keys which toggle electrical power to the TV, change the channel to a higher number, change the channel to a lower number, turn the sound volume up, and turn the sound volume down. A typical remote control unit for a video cassette recorder (VCR) includes separate keys which toggle electrical power to the VCR, activates replay of a cassette tape within a cassette receiver, stops replay of a cassette tape within the receiver, and rewinds a cassette tape within the receiver.

Many video devices such as TVs, VCRs, and digital versatile disk (DVD) players allow configuration via on-screen programming using the corresponding remote control device. The user configures the video device by selecting an option from a list of options or "menu" displayed upon the TV screen. Such on-screen programming allows a user to properly configure a complex video device by simply pressing keys on the keypad of a remote control device.

Many different types of portable computing devices, including laptop computers, notebook computers, sub-notebook computers, hand-held computers, palmtop computers, and personal digital assistants (PDAs), are now widely available. Most sub-notebook and smaller computers include an IR transceiver port, as do many laptop and notebook computers. IR transceiver ports allows wireless communication with other devices configured for IR communication (e.g., other portable computers, desktop computers, printers, etc.).

Software configuration and control of the IR transceiver ports allows many different IR signal coding methods and transmission protocols to be supported. Thus a portable computing device with an IR transceiver port is most likely capable of sending the coded IR signals used by consumer electronics devices. In addition, most laptop computers and PDAs also include a display device capable of displaying menus which could be used to configure consumer electronics devices. It would thus be desirable to have an apparatus and method for configuring and controlling multiple consumer electronics devices using a portable computing device having an IR tansceiver port. Such an apparatus and method would allow a user owning a portable computing device having an IR transceiver port to configure and control multiple consumer electronic devices using the portable computing device.

SUMMARY OF THE INVENTION

The problems outlined above are in large part solved by an audio/video device including audio/video circuitry, a control unit, and an infrared transceiver. The audio/video circuitry receives input presentation data (i.e., video and/or audio data) and performs an audio/video operation (e.g., decoding, filtering, amplification, etc.) upon the input presentation data in order to produce output presentation data The control unit is coupled to and controls the operations of the audio/video circuitry and the infrared transceiver. The infrared transceiver transmits and receives configuration data via infrared signals, wherein received configuration data is used to configure operation of the audio/video circuitry.

The input presentation data may originate external to the audio/video device (e.g., from another audio/video device, an antenna, a cable television service provider, etc.), or the audio/video device may include a drive unit for retrieving the input presentation data from a recording medium. When the recording medium is an optical disk, the drive unit is a disk drive unit. When the recording medium is magnetic tape wound around a reel of a cassette, the drive unit is a cassette drive unit.

The infrared transceiver includes an infrared transmitter and an infrared receiver. The infrared transmitter is used to transmit infrared signals conveying a set of configuration options to a device external to the audio/video device. The infrared receiver is used to receive an infrared signal indicating a selected member of the set of configuration options. The external device may be a portable computer having an infrared transceiver and including a main unit having a battery power supply which provides all of the electrical power requirements of the main unit. The infrared signal indicating the selected member of the set of configuration options may be received from the external device (e.g., the portable computer). The infrared signals may include modulated IR light. The IR light may have a wavelength between about 750 nanometers and approximately 3,000 nanometers.

The audio/video device may also include a remote control unit having an infrared transmitter for transmitting infrared signals. In this case, it is advantageous for the portable computer to transmit IR signals in the same manner as (i.e., emulate) the remote control unit. When the portable computer emulates the remote control unit, the infrared signal indicating the selected member of the set of configuration options may be received from either the external device or from the remote control unit.

The audio/video device may be, for example, a television set. In this case, the audio/video circuitry receives encoded video information from an external source (e.g., an antenna, a cable television service provider, another audio/video device, etc.). The encoded video information may be encoded according to a standard television broadcast format (e.g., national television system committee or NTSC, phase alternate line or PAL, etc.). The audio/video circuitry decodes the encoded video information producing decoded video information, and provides the decoded video information to a display device (e.g., a cathode ray tube). The display device receives and displays the decoded video information. The audio/video device includes an infrared transceiver for transmitting and receiving configuration data via infrared signals as described above. Received configuration data is used to configure the audio/video circuitry.

The audio/video device may also be, for example, a video cassette recorder (VCR) or a digital versatile disk (DVD) player. Such an audio/video device includes a drive unit for retrieving encoded video data from a recording medium. When the audio/video device is a DVD player, the recording medium is an optical disk, and the drive unit is a disk drive unit. When the audio/video device is a VCR, the recording medium is magnetic tape wound around a reel of a cassette, and the drive unit is a cassette drive unit. The audio/video device includes audio/video circuitry which receives the encoded video data from the drive unit The encoded video data may be, for example, digital video data compressed and encoded according to a Moving Pictures Experts Group (MPEG) standard (e.g., MPEG-2). The audio/video circuitry decodes the encoded video data, thereby producing decoded video data. The audio/video circuitry may then encode the decoded video data according to a standard television broadcast format (e.g., NTSC, PAL, etc.) thereby producing encoded video information. The audio/video circuitry may provide the encoded video information at output terminals. Again, the audio/video device includes an infrared transceiver for transmitting and receiving configuration data via infrared signals, and received configuration data is used to configure the audio/video circuitry.

The present method of configuring the audio/video device described above includes transmitting a set of configuration options from the audio/video device to a device external to the audio/video device using the infrared transmitter. An infrared signal indicating a selected member of the set of configuration options is received from the external device via the infrared receiver. As described above, the external device may be a portable computer. The audio/video device may also include a remote control unit having an infrared transmitter for transmitting infrared signals. In this case, it is advantageous for the portable computer to transmit IR signals in the same manner as (i.e., emulate) the remote control unit. When the portable computer emulates the remote control unit, the infrared signal indicating the selected member of the set of configuration options may be received from either the external device or from the remote control unit.

BRIEF DESCRIPTION OF THE DRAWINGS

Other objects and advantages of the invention will become apparent upon reading the following detailed description and upon reference to the accompanying drawings in which.

Figure 1:
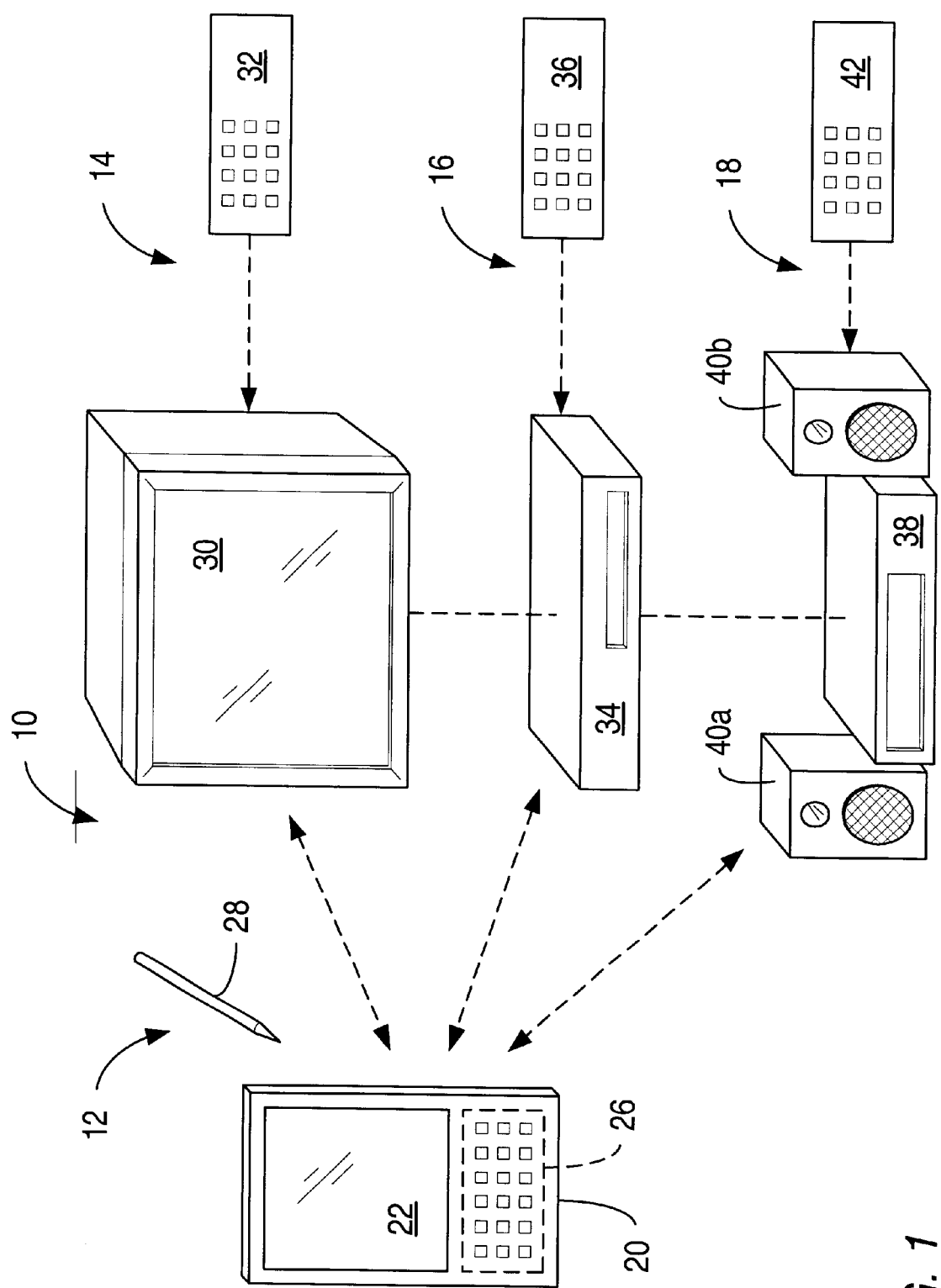
FIG. 1 is a block diagram of one embodiment of an electronic system in accordance with the present invention, wherein the electronic system includes a portable computer capable of communication with three audio/video devices via separate two-way infrared communication links.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a block diagram of one embodiment of an electronic system 10 in accordance with the present invention. Electronic system 10 includes a portable computer 12 and three audio/video devices 14, 16, and 18. Portable computer 12 includes an infrared transceiver, as do audio/video devices 14, 16, and 18. Portable computer 12 communicates with audio/video devices 14, 16, and 18 via separate two-way wireless infrared (IR) communication links. Each two-way wireless IR communication link is used to exchange configuration data used to configure the operation of the respective audio/video device.

Portable computer 12 may be, for example, a notebook computer, a sub-notebook computer, a hand-held computer, a palmtop computer, or a personal digital assistant (PDA). Such portable computers typically include infrared transceivers for two-way wireless communication with other computers and peripheral devices (e.g., printers) having infrared transceivers.

Portable computer 12 includes a main unit 20. Main unit 20 includes a battery power supply which supplies all of the electrical power requirements of main unit 20. Main unit 20 also has a display device such as a display screen 22. Portable computer 12 also includes an input device for receiving user input. The input device may be, for example, a keypad or keyboard 26. Keypad or keyboard 26 may be built in to main unit 20, or may be separate from main unit 20. A separate keypad or keyboard 26 may be connected to main unit 20 by one or more wires or by a wireless communication link (e.g., an IR communication link). Alternately, the input device may be a digitizer tablet. In this case, portable computer 12 may include a pen or stylus 28 having a pointed end. The digitizer tablet may track the location of the pointed end of the pen or stylus as it is moved across an upper surface of the digitizer tablet, thereby capturing hand-drawn user input. The digitizer tablet may be incorporated into display screen 22 in order to keep main unit 20 as small as possible. Portable computer 12 may include handwriting recognition software to facilitate acceptance of hand-drawn user input.

Audio/video device 14 may be, for example, a television set including a television receiver 30 and a remote control unit 32. Television receiver 30 includes audio/video circuitry which receives encoded video information from an external source (e.g., an antenna, a cable television service provider, another audio/video device, etc.). The encoded video data may be encoded according to a recognized standard television broadcast format (e.g., national television system committee or NTSC, phase alternate line or PAL, etc.). The audio/video circuitry decodes the encoded video information, producing decoded video information. Television receiver 30 also includes a display device (e.g., a cathode ray tube). The audio/video circuitry provides the decoded video information to the display device which displays the decoded video information.

Television receiver 30 also includes an infrared transceiver for transmitting and receiving configuration data. The configuration data is used to configure the operation of audio/video device 14. For example, the configuration data may initiate a programming mode which searches through all television channels to find those channels upon which encoded video data is received. Channels upon which encoded video data is not received are skipped during subsequent "channel up" and "channel down" operations. The configuration data may also determine whether textual messages conveying an audio content (i.e., "closed captioning" messages) are displayed at the bottom of a display screen of the display device.

During the configuration of audio/video device 14, the IR transmitter of television receiver 30 is used to transmit IR signals conveying a set of configuration options (i.e., an option "menu") to portable computer 12. The IR receiver of portable computer 12 receives the IR signals, and the option menu is displayed upon display screen 22. The user selects a member of the set of configuration options using the input device of portable computer 12 (e.g., by pressing a corresponding key upon keypad or keyboard 26, by touching pen or stylus 28 to a corresponding portion of the upper surface of the digitizer, etc.). The IR transmitter of portable computer 12 is used to transmit an IR signal conveying the selected member of the set of configuration options to television receiver 30. The IR receiver of television receiver 30 receives the IR signal transmitted by portable computer 12, and audio/video device 14 is configured accordingly.

It is noted that audio/video device 14 includes a display device having a display screen, and audio/video device 14 may have on-screen programming capability. When such on-screen programming is enabled, the option menu may be displayed upon the display screen of the display device. The user may use remote control unit 32 to select a member of the set of configuration options (e.g., by pressing a corresponding key upon a keypad of remote control unit 32). An IR transmitter of remote control unit 32 may transmit an IR signal conveying the selected member of the set of configuration options to the IR receiver of television receiver 30.

It is deemed advantageous that portable computer 12 transmit IR signals in the same manner as (i.e., emulate) remote control unit 32 when communicating with audio/video device 14. When portable computer 12 emulates remote control unit 32, an infrared signal received from either portable computer 12 or remote control unit 32 may be used to configure the operation of television receiver 30 of audio/video device 14. Not only is existing remote control technology and hardware utilized to the greatest extent possible, either portable computer 12 or remote control unit 32 may be used to configure the operation of audio/video device 14 in the event the other is not available (e.g., missing or lost).

Audio/video device 16 may be, for example, a device for reproducing video presentations stored upon a recording medium (e.g., a video cassette recorder or VCR, a digital versatile disk or DVD player, etc.). The recording medium may be a magnetic tape wound around a reel within a cassette (e.g., VCR) or an optical disk (e.g., DVD player). Audio/video device 16 includes a main unit 34 and a remote control unit 36. Main unit 34 includes a drive unit for retrieving data stored upon the recording medium. When the recording medium is magnetic tape wound around a reel within a cassette (e.g., VCR), the drive unit is a cassette drive unit. When the recording medium is an optical disk (e.g., DVD player), the drive unit is a disk drive unit.

The drive unit of main unit 34 retrieves video data from the recording medium. The video data may be encoded to reduce the physical size of the recording medium and/or reduce transmission errors. Main unit 34 includes audio/video circuitry which receives the encoded video data from the drive unit and decodes the encoded video data, thereby producing decoded video data.

Main unit 34 of audio/video device 16 may be coupled to television receiver 30 of audio/video device 14. The audio/video circuitry of main unit 34 may encode the decoded video information according to a recognized standard television broadcast format (e.g., NTSC, PAL, etc.) and provide the resulting encoded video information to audio/video device 14. The audio/video circuitry of television receiver 30 may decode the encoded video information and provide the resulting decoded video information to the display device which displays the decoded video information.

Main unit 34 includes an infrared transceiver for transmitting and receiving configuration data. The configuration data is used to configure the operation of main unit 34 of audio/video device 16. For example, the configuration data may be used to set a digital clock of a VCR or enable VCR recording at a specific time according to the digital clock. In the case of a DVD player, the configuration data may be used to select from among a wide variety of viewing and listening options. For example, DVD viewing options include display format, camera angle, and textual messages conveying audio content (i.e., subtitles).

A standard television (IV) has a width-to-height (i.e., aspect) ratio of 4:3, while a widescreen TV has an aspect ratio of 16:9. Video data can be stored on a DVD for standard TV (4:3 display data) or widescreen TV (16:9 display data). DVD player display format options include full frame (4:3 format from 4:3 display data), letterbox (4:3 format from 16:9 display data), pan & scan (4:3 format from 16:9 display data), and widescreen (16:9 format from 16:9 display data). In letterbox format, a wide black stripe is added across the tops and bottoms of the 16:9 display data images such that proper proportions are maintained when the images are displayed upon a 4:3 screen. In pan & scan format, only 4:3 portions of the 16:9 display data images are displayed. Images "shot" from several different camera angles may be recorded on the disk, and the user may select any one of these camera angles for viewing. Subtitles in any one of up to 32 different languages may be superimposed upon portions of the images. DVD audio options include language, number of channels, dynamic range, and volume. The user may select one of up to 8 different languages for playback. The user may also select desired values for number of audio channels, dynamic range, and volume. Each of the up to 8 sound tracks in different languages may have up to 8 audio channels.

During the configuration of audio/video device 16, the IR transmitter of main unit 34 is used to transmit IR signals conveying a set of configuration options (i.e., an option "menu") to portable computer 12. The IR receiver of portable computer 12 receives the IR signals, and the option menu is displayed upon display screen 22 as described above. The user selects a member of the set of configuration options using the input device of portable computer 12, and the IR transmitter of portable computer 12 is used to transmit an IR signal conveying the selection to main unit 34. The IR receiver of main unit 34 receives the IR signal transmitted by portable computer 12, and audio/video device 16 is configured accordingly.

It is noted that audio/video device 16 may be coupled to audio/video device 14 having a display screen, and audio/video device 16 may have on-screen programming capability. When such on-screen programming is enabled, the option menu may be displayed upon the display screen as described above. The user may use remote control unit 36 to select a member of the set of configuration options, and an IR transmitter of remote control unit 36 may transmit an IR signal conveying the selection to the IR receiver of main unit 34.

For the same reasons described above, it is considered advantageous that portable computer 12 transmit IR signals in the same manner as (i.e., emulate) remote control unit 36 when communicating with audio/video device 16. When portable computer 12 emulates remote control unit 36, an infrared signal received from either portable computer 12 or remote control unit 36 may be used to configure the operation of audio/video device 16.

Audio/video device 18 may be, for example, a device for reproducing audio presentations stored upon a recording medium (e.g., a cassette tape player, a digital audio tape or DAT player, a compact disk or CD player, etc.). The recording medium may be a magnetic tape wound around a reel within a cassette (cassette tape player, DAT player, etc.) or an optical disk (CD player, etc.).

Audio/video device 18 includes a main unit 38, a pair of speakers 40a and 40b, and a remote control unit 42. Main unit 38 includes a drive unit for retrieving data stored upon the recording medium. When the recording medium is magnetic tape wound around a reel within a cassette, the drive unit is a cassette drive unit (cassette tape player, DAT player, etc.). When the recording medium is an optical disk, the drive unit is a disk drive unit (CD player, etc.).

The drive unit of main unit 38 retrieves audio data from the recording medium (e.g., sound, music, etc.). The audio data may be encoded to reduce the physical size of the recording medium, reduce transmission errors, and/or to improve the signal-to-noise ratio. Main unit 38 includes audio/video circuitry which performs any required decoding of encoded audio data retrieved from the recording medium, thereby producing decoded audio information. The decoded audio information may be provided to speakers 40a–b which transform electrical energy into sound energy, resulting in the reproduced audio performance.

Main unit 38 includes an infrared transceiver for transmitting and receiving configuration data. The configuration data is used to configure the operation of audio/video device 18. For example, the configuration data may select one of several audio presentations recorded upon the recording medium.

During the configuration of audio/video device 18, the IR transmitter of main unit 38 is used to transmit IR signals conveying an option menu to portable computer 12. The IR receiver of portable computer 12 receives the IR signals, and the option menu is displayed upon display screen 22 as described above. The user selects a member of the set of configuration options using the input device of portable computer 12, and the IR transmitter of portable computer 12 is used to transmit an IR signal conveying the selection to main unit 38. The IR receiver of main unit 38 receives the IR signal transmitted by portable computer 12, and main unit 38 of audio/video device 18 is configured accordingly.

It is noted that the user may use remote control unit 42 to select a member of the set of configuration options, and an IR transmitter of remote control unit 42 may transmit an IR signal conveying the selection to the IR receiver of main unit 38. For the same reasons described above, it is considered advantageous that portable computer 12 transmit IR signals in the same manner as (i.e., emulate) remote control unit 42 when communicating with audio/video device 18. When portable computer 12 emulates remote control unit 42, an infrared signal received from either portable computer 12 or remote control unit 42 may be used to configure the operation of audio/video device 18.

It is noted that the drive unit of audio/video device 16 may also retrieve audio data stored upon the recording medium along with the video data. The audio data may be encoded to reduce the physical size of the recording medium, to reduce transmission errors, and/or to improve the signal-to-noise ratio. The audio/video circuitry of audio/video device 16 may perform any required decoding of encoded audio data retrieved from the recording medium, thereby producing decoded audio data. The decoded audio information may be provided to audio/video device 18, and speakers 40a–b may reproduce the audio portion of a performance. Alternately, audio/video device 16 may provide the encoded audio data audio/video device 18, and the audio/video circuitry of audio/video device 18 may perform the decoding producing decoded audio information. The audio/video circuitry may provide the decoded audio information to speakers 40a–b.

Regarding electronic system 10, it is considered advantageous that portable computer 12 emulate remote control units 32, 36, and 42 when communicating with audio/video devices 14, 16, and 18, respectively. In this case, an infrared signal received from either portable computer 12 or remote control units 32, 36, or 42 may be used to configure the operation of respective audio/video devices 14, 16, and 18.

Figure 2:
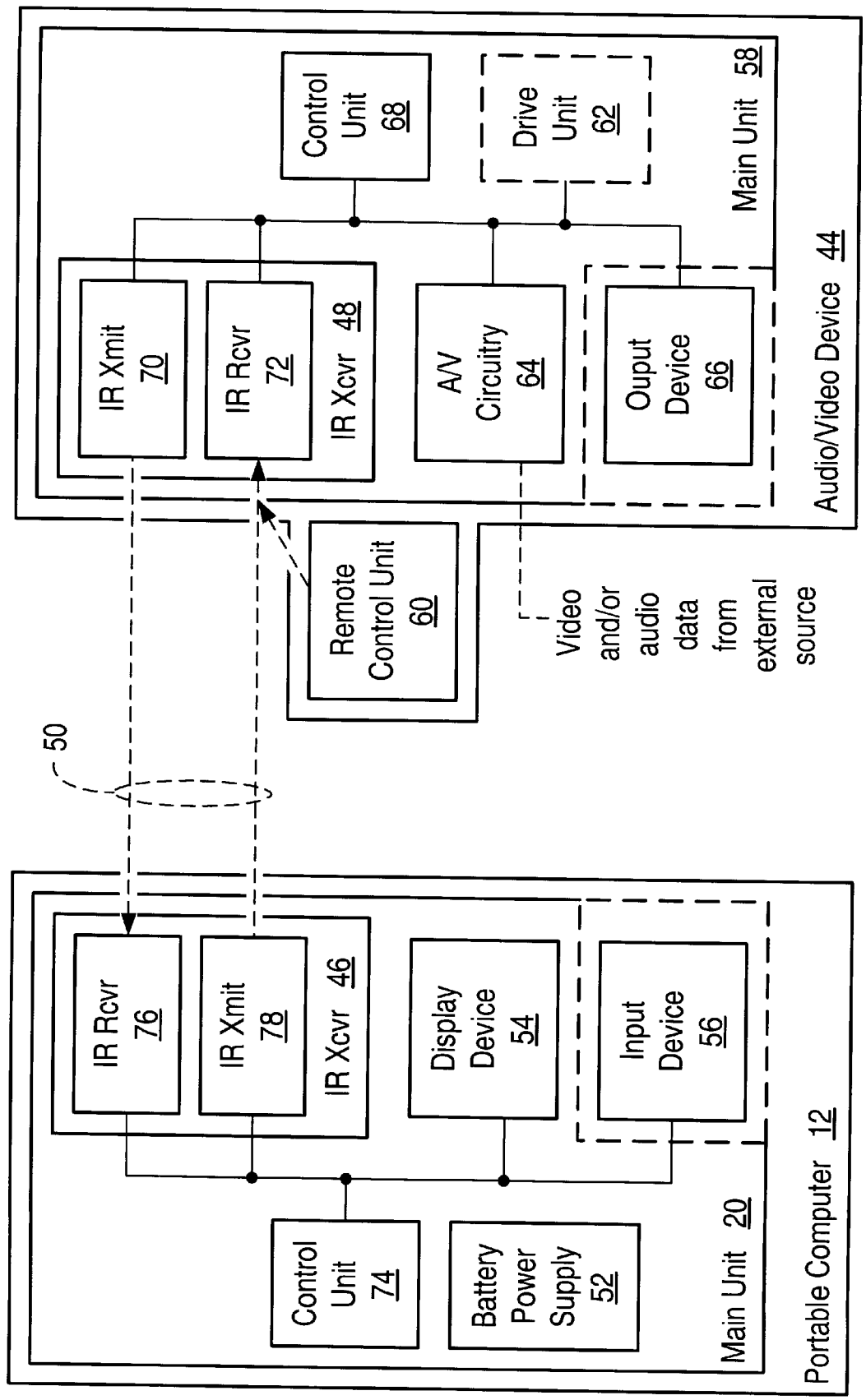
FIG. 2 is a block diagram of one embodiment of the portable computer of FIG. 1 in wireless infrared communication with a representative audio/video device.

FIG. 2 is a block diagram of one embodiment of portable computer 12 in wireless IR communication with a generic audio/video device 44. Audio/video device 44 represents audio devices 14, 16, and 18 described above. Portable computer 12 includes an infrared transceiver 46, and audio/video device 44 includes an infrared transceiver 48. Portable computer 12 communicates with audio/video device 44 via a two-way wireless IR communication link 50. IR communication link 50 is used to exchange configuration data used to configure the operation of the audio/video device 44.

Main unit 20 of portable computer 12 houses a battery power supply 52 which supplies all of the electrical power requirements of main unit 20. Main unit 20 also houses a display device 54. Display device 54 may include display screen 22 described above. Portable computer 12 also includes an input device 56 for receiving user input. Input device 56 may be keypad or keyboard 26 described above. Input device 56 may be housed within main unit 20, or may be separate from main unit 20. A separate input device 56 may be connected to main unit 20 by one or more wires or by a wireless communication link (e.g., an IR communication link). Alternately, input device 56 may be a digitizer tablet. In this case, portable computer 12 may include pen or stylus 28 described above. The digitizer tablet may be incorporated into display device 54 in order to keep main unit 20 as small as possible. Portable computer 12 may include handwriting recognition software to facilitate acceptance of user input drawn by hand upon the digitizer tablet.

Audio/video device 44 may be, for example, a television set, a VCR, a DVD player, a cassette tape player, a DAT player, or a CD player. Audio/video device 44 includes a main unit 58 and a remote control unit 60. Main unit 58 may receive encoded video and/or audio information form an external source, or may include a drive unit 62 for retrieving video and/or audio data stored upon a recording medium. The encoded video and/or audio data may be encoded to reduce the physical size of the recording medium, to reduce transmission errors, to improve the signal-to-noise ratio, or according to a recognized standard television broadcast format (e.g., NTSC, PAL, etc.). Main unit 58 includes audio/video circuitry 64 which receives the encoded video and/or audio information and decodes the encoded video and/or audio information, thereby producing decoded video and/or audio information. Main unit 58 includes an output device 66. Output device 66 may be a display device (e.g., a cathode ray tube), one or more speakers, or video and/or audio drive circuitry. Audio/video circuitry 64 provides the decoded video and/or audio information to output device 66.

Main unit 58 of audio/video device 44 also houses IR transceiver 48 and a control unit 68. IR transceiver 48 includes an IR transmitter 70 for transmitting IR signals and an IR receiver 72 for receiving IR signals. Control unit 68 is coupled to and controls the operations of IR transmitter 70, IR receiver 72, audio/video circuitry 64, output device 66, and drive unit 62 (if present).

Main unit 20 of portable computer 12 houses IR transceiver 46 and a control unit 74. IR transceiver 46 includes an IR transmitter 76 for transmitting IR signals and an IR receiver 78 for receiving IR signals. Control unit 74 is coupled to and controls the operations of IR transmitter 76, IR receiver 78, and display device 54. Control unit 74 is also coupled to and controls the operations of input device 56 when input device 56 is housed within main unit 20. When input device 56 is separate from main housing 20, control unit 74 is operably coupled to input device 56 (e.g., via an IR link), and may control the operations of input device 56.

During the configuration of audio/video device 44, IR transmitter 70 of main unit 58 is used to transmit IR signals conveying a set of configuration options (i.e., an option "menu") to portable computer 12. IR receiver 76 of portable computer 12 receives the IR signals, and the option menu is displayed via display device 54. The user selects a member of the set of configuration options using input device 56 of portable computer 12 (e.g., by pressing a corresponding key upon keypad or keyboard 26, by touching pen or stylus 28 to a corresponding portion of the upper surface of the digitizer, etc.). IR transmitter 78 of portable computer 12 is used to transmit an IR signal conveying the selected member of the set of configuration options to main unit 58 of audio/video device 44. IR receiver 72 of main unit 58 receives the IR signal transmitted by portable computer 12, extracts the configuration data from the received IR signal, and provides the received configuration data to control unit 68. Control unit 68 configures audio/video device 44 according to the received configuration data.

When output device 66 of audio/video device 44 is a display device having a display screen, or when audio/video device 44 produces video data and is intended to be coupled to another audio/video device having a display screen, audio/video device 44 may include on-screen programming capability. When such on-screen programming is enabled, the option menu may be displayed upon the display screen. The user may use remote control unit 60 to select a member of the set of configuration options (e.g., by pressing a corresponding key upon a keypad of remote control unit 60). An IR transmitter of remote control unit 60 may transmit an IR signal conveying the selected member of the set of configuration options to IR receiver 72 of main unit 58.

For the reasons discussed above, it is deemed advantageous that portable computer 12 transmit IR signals in the same manner as (i.e., emulate) remote control unit 60 when communicating with audio/video device 44. When portable computer 12 emulates remote control unit 60, an infrared signal received from either portable computer 12 or remote control unit 60 may be used to configure the operation of audio/video device 44. Not only is existing remote control technology and hardware utilized to the greatest extent possible, either portable computer 12 or remote control unit 60 may be used to configure the operation of audio/video device 44 in the event the other is not available (e.g., missing or lost).

IR transmitters 70 and 78 and the IR transmitter of remote control unit 60 include a source of infrared light, and may transmit the IR signals by modulating the light produced by the IR light source. Each IR light source may produce light having wavelengths within the IR portion of the electromagnetic spectrum which spans from about 750 nanometers to approximately 3,000 nanometers. IR receivers 72 and 76 may receive the modulated IR light produced by respective IR transmitters 78 and 70. IR receivers 72 and 76 may demodulate the modulated IR light, producing output signals conveying the received configuration data.

Numerous variations and modifications will become apparent to those skilled in the art once the above disclosure is fully appreciated. It is intended that the following claims be interpreted to embrace all such variations and modifications.

What is claimed is:

1. An entertainment system comprising:
   a plurality of entertainment units including at least one of a television receiver, a video cassette recorder, a digital video disk player, an audio cassette player and a compact disc player,
      wherein each of said plurality of entertainment units includes a first infrared transceiver configured to transmit a configuration menu including a plurality of respective entertainment unit configuration options;
      wherein each of said plurality of entertainment units is configured to receive, via said respective first infrared transceiver, a particular entertainment unit configuration option selection; and
      wherein said particular entertainment unit configuration option selection is used to configure operation of each of said plurality of entertainment units;
   a portable computing device, including:
      a second infrared transceiver configured to receive said configuration menu;
      a display device configured to generate a visual display of said configuration menu; and
      an input device configured to receive a user-controlled indication of said particular entertainment unit configuration option selection;
         wherein the second infrared transceiver is further configured to transmit the particular entertainment unit configuration option selection; and
   a remote control unit including a remote infrared transmitter configured to transmit said particular entertainment unit configuration option selection to said respective first infrared transceiver of said plurality of entertainment units.

2. The entertainment system as recited in claim 1, wherein the portable computing device is further configured to emulate the remote control unit.

3. The entertainment system as recited in claim 1, wherein the portable computing device includes a personal digital assistant (PDA).

4. The entertainment system as recited in claim 1, wherein each of said first infrared transceivers include a first transmitter and a first receiver, and wherein each of said first transmitters is configured to transmit said configuration menu encoded into infrared signals and each of said first receivers is configured to receive and decode said particular entertainment unit configuration option selection from said infrared signals.

5. The entertainment system as recited in claim 4, wherein said second infrared transceiver includes a second transmitter and a second receiver, and wherein said second transmitter is configured to transmit said particular entertainment unit configuration option selection encoded into said infrared signals and said second receiver is configured to receive and decode said configuration menu from said infrared signals.

6. The entertainment system as recited in claim 5, wherein the infrared signals comprise modulated infrared light.

7. The entertainment system as recited in claim 6, wherein the infrared light has a wavelength between about 750 nanometers and approximately 3,000 nanometers.

8. A method of configuring an entertainment system including a plurality of entertainment units, the method comprising:
- a first infrared transceiver of each of the plurality of entertainment units transmitting a configuration menu including a plurality of respective entertainment unit configuration options to a portable computing device;
- a display device of the portable computing device generating a visual display the configuration menu;
- an input device of the portable computing device receiving a user-controlled indication of a particular entertainment unit configuration option selection;
- a second infrared transceiver of the portable computing device transmitting the particular entertainment unit configuration option selection to the respective entertainment unit;
- the first infrared transceiver of each of the plurality of entertainment units receiving the particular entertainment unit configuration option selection; and
- a remote infrared transmitter of a remote control unit transmitting said particular entertainment unit configuration option selection to said respective first infrared transceiver of said plurality of entertainment units;
- configuring each of the plurality of entertainment units according to the particular entertainment unit configuration option selection;
    - wherein said plurality of entertainment units including at least one of a television receiver, a video cassette recorder, a digital video disk player, an audio cassette player and a compact disc player.

9. The method as recited in claim 8, wherein the portable computing device includes a personal digital assistant (PDA).

10. The method as recited in claim 8 further comprising encoding said configuration menu into infrared signals and transmitting said infrared signals.

11. The method as recited in claim 10 further comprising receiving said infrared signals and decoding said infrared signals into said configuration menu.

12. The method as recited in claim 8 further comprising encoding said particular entertainment unit configuration option selection into infrared signals and transmitting said infrared signals.

13. The method as recited in claim 12 further comprising receiving said infrared signals and decoding said infrared signals into said particular entertainment unit configuration option selection.

* * * * *